United States Patent [19]

Johnson

[11] 4,191,125
[45] Mar. 4, 1980

[54] FREEZE INDICATOR

[75] Inventor: Claude D. Johnson, Arden, N.C.

[73] Assignee: Akzona Incorporated, Asheville, N.C.

[21] Appl. No.: 921,940

[22] Filed: Jul. 3, 1978

[51] Int. Cl.² .................... G01K 11/08; G01K 11/12; G01K 11/14
[52] U.S. Cl. .................... 116/219; 252/408
[58] Field of Search .................... 116/114.5, 114 Y; 252/408; 239/2 R, 2 S; 73/356, 358

[56] References Cited

U.S. PATENT DOCUMENTS

| | | | |
|---|---|---|---|
| 2,903,188 | 9/1959 | Hutchinson | 239/2 R |
| 3,055,759 | 9/1962 | Busby | 116/114.5 |
| 3,056,556 | 10/1962 | Sanger | 239/2 R |
| 3,127,107 | 3/1964 | Merryweather | 239/2 R |
| 3,414,415 | 12/1968 | Broad | 116/114.5 |
| 3,545,400 | 12/1970 | Smith | 116/219 |
| 3,596,476 | 8/1971 | Jakob | 239/2 S |
| 3,760,598 | 9/1973 | Jakob | 239/2 S |
| 3,826,141 | 7/1974 | Pickett | 73/358 |
| 3,946,612 | 3/1976 | Sagi | 73/358 |
| 3,956,153 | 5/1976 | Chadha | 116/114.5 |
| 3,980,581 | 9/1976 | Godsey | 116/114.5 |
| 4,145,918 | 3/1979 | Couch | 116/216 |

*Primary Examiner*—S. Clement Swisher
*Assistant Examiner*—Denis E. Corr
*Attorney, Agent, or Firm*—Francis W. Young; David M. Carter

[57] ABSTRACT

There is provided a freeze indicator which includes a frangible ampule substantially filled with a mixture of water, a nucleating agent, and a surfactant. Upon reaching the freezing point of water, most of the water will freeze and expand, and fracture the frangible ampule. The nucleating agent has substantially similar molecular space grouping to frozen liquid to overcome the undercooling effect. The surfactant provides an increased surface area of contact between the water and the nucleating agent. The frangible ampule is in contact with a pad which has a water soluable dye printed on one side. When the ampule breaks, it releases some of the water, and the dye is wicked to one side of the pad by the water, showing a color change. In order to fine-tune the freeze indicator, varying amounts of deuterium oxide may be added to the water to raise its freezing point.

13 Claims, 3 Drawing Figures

FREEZE INDICATOR

BACKGROUND OF THE INVENTION

This invention relates to freeze indicators. More particularly, it relates to freeze indicators which may be adjusted to provide precise information to the user that a product has been exposed to a certain low temperature normally near the freezing point of water.

Freeze indicators which utilize the expansion characteristic of water to break a frangible ampule have been provided as, for example, in Smith U.S. Pat. No. 3,545,400. Once the device shown in the Smith patent is exposed to temperatures below the freezing point of water, the water expands into ice, causing the ampule to break. After the ice was formed and after the surrounding temperature returned to a point above the melt point of the ice, the water was absorbed on a dye loaded pad, thus giving an indication that the device has gone through a freeze stage and back through a thaw stage.

Problems have arisen in giving an accurate indication of the passage of the device through the normal freezing point of water, i.e. 0° C., due to the undercooling effect of water which will permit water to stay in its liquid state substantially below its normal freezing point as, for example, as low as $-16°$ C. This problem has been partially overcome by the addition of certain nucleating agents to the water. An example of this is shown in British Patent No. 1,245,135, issued to Scheller. Scheller discloses the technique of adding powdered glass to an ammonium chloride solution to avoid undercooling.

U.S. Pat. Nos. 3,956,153 and 3,980,581, issued respectively to Chadha and Godsey, disclose the use of nucleating agents having substantially similar space groups to thermal responsive materials used in disposable thermometers.

OBJECTS OF THE INVENTION

It is one object of this invention to provide an improved freeze indicator.

It is another object of this invention to provide a freeze indicator which substantially overcomes the problems of undercooling.

It is still another object of this invention to provide a freeze indicator which is both accurate and reliable.

It is still another object of this invention to provide a freeze indicator which may be adjusted during manufacturing to provide accurate indications of certain predetermined temperatures.

It is still another object of this invention to provide a freeze indicator which gives an immediate irreversible indication that the temperature has dropped below a certain level.

SUMMARY OF THE INVENTION

In accordance with one form of this invention, there is provided a freeze indicator which includes a frangible container housing a liquid which expands upon freezing, thereby fracturing the container. A nucleating agent is added to the liquid. The nucleating agent has a substantially similar molecular space grouping with the frozen liquid whereby undercooling is substantially prevented.

In accordance with another form of this invention, there is provided a freeze indicator, including a frangible container housing a liquid which expands upon freezing, thereby fracturing the container. The liquid includes a mixture of water and deuterium oxide to enable one to substantially fine-tune the freezing point of the liquid and thus the temperature indication level of the freeze indicator.

Further, in accordance with another form of this invention, there is provided a freeze indicator including a frangible container housing a liquid which expands upon freezing, thereby fracturing the container. A nucleating agent and a surfactant are added to the liquid. The surfactant increases the surface area of contact between the nucleating agent and the liquid. Furthermore, the surfactant decreases the surface tension with respect to the liquid in the ampule, which may permit quick wetting of an indicator pad so that an immediate indication of freeze is provided rather than having to wait until the contents of the container thaw.

DESCRIPTION OF THE PREFERRED EMBODIMENT

Figure 1:
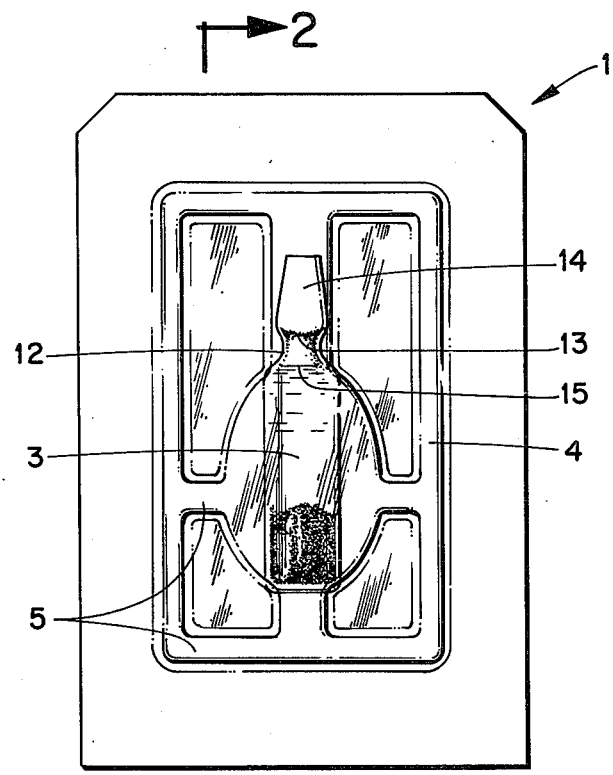
FIG. 1 is a top plan view of the indicator incorporating some of the features of the invention.

Referring now more particularly to FIG. 1, there is provided freeze indicator 1 which includes frangible housing 3 which may be made of glass or possibly high impact polystyrene.

Figure 2:
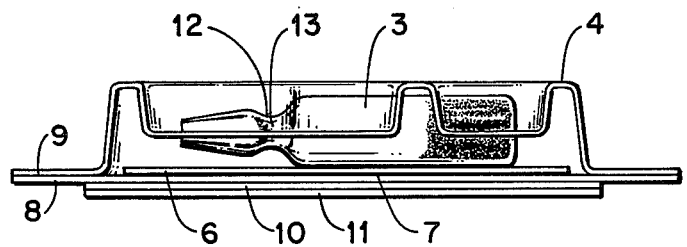
FIG. 2 is a cross-sectional side elevational view of the device shown in FIG. 1 taken along line 2—2.

Referring now to FIG. 2, frangible container 3 houses a liquid, such as water, which undergoes expansion upon freezing, thereby fracturing the frangible container when the environment around the indicator passes below the freezing point of water. In order to avoid the undercooling effects which depress the freezing point of water significantly, a type of nucleating agent is added to the water. The nucleating agent most preferred is one which has substantially the same molecular space grouping as the frozen water. This provides for faster and more complete crystal growth when the environment passes below the freezing point of water.

Examples of accepted nucleating agents are cupric sulfide and beryllium aluminum silicate. Other acceptable materials are ferrous sulfide, zinc metal, molybdenum sulfide, and tungsten sulfide. Also, silver iodine has been shown to provide adequate results.

In order to increase the surface area of contact between nucleating agents and the water, a surfactant or wetting agent has also been added to the mixture. Suitable surfactants include Atlas G-2127, Tween 80, and Ultrawet 60L, all of which are commercially available. Tween 80 is represented by the chemical expression polyoxyethylene 20 sorbitan mono-oleate.

In order to fine-tune the device so that an indication is given for a predetermined temperature, an amount of deuterium oxide may be added to the water. Deuterium oxide ($D_2O$) has a normal freeze point around 4° C. By adding the proper amount of $D_2O$ to $H_2O$, the freeze point of the mixture may be raised accordingly to accomodate particular needs. Even by using the above mentioned nucleating agents, it has been found that the deivce, without $D_2O$ added, freezes at about $-4°$ C. By formulating a mixture of 98% $D_2O$ and 2% $H_2O$, the freeze point is raised to approximately 0° C. Various freeze points between $-4°$ C. and 0° C. may be provided by adding lesser and lesser amount of D₂O below 98%. Since frozen deuterium oxide has the same molecular space groupings as frozen water, the same nucleating agents as mentioned above may also be used to overcome the undercooling affect.

As can be seen in FIG. 2, the frangible ampule is protected from damage before freezing by a semi-rigid plastic blister 4. This blister 4 has various ridges 5 which provide mechanical strength to the device so that the ampule will not break if handled roughly. The blister may be of formed polyvinyl chloride.

Immediately below the frangible ampule is indicator pad 6 which is a layer of absorbant material such as Whatman 3 MM paper, available from Whatman Company. A water soluble dye 7 is printed on the backside of Whatman pad 6. When the ampule 3 is broken, an amount of unfrozen water is released from the ampule and poured onto pad 6, and is absorbed down to dye layer 7. The water will dissolve the dye, causing the dye to migrate to the top of the pad nearest the ampule. Since blister 4 is an optically clear material, a visible indication of freeze is then provided.

In most prior art freeze indicators, a thaw must occur in order to determine that the environment had ever undergone freeze due to the fact that upon freezing, the liquid, such as water, becomes solid and cannot possibly wetten an indicator.

It is uncertain as to why, in applicant's device, this wetting occurs immediately upon freezing and breakage of the ampule; however, it is possible that there is only sufficient solidification of a portion of the water to break the ampule, but enough liquid remaining present to give an immediate color change on the indicator papaer. Also, as the water freezes and expands into ice, the pressure in the remaining part of the ampule increases, causing a depression of the freezing point of the remaining water. When the ampule breaks, there is a sudden decrease in pressure inside the ampule, causing the water to be quickly propelled onto the indicator pad before it can freeze. Also, the surfactant assists in the removal of the water from the cracked ampule by lowering the surface tension between the water and the fractured ampule, thus providing a dual function for the surfactant, the other function being to increase the surface area of contact between the liquid and the nucleating agent.

Referring again to FIG. 2, the blister cover 4 is sealed to backing 8 around edges 9 of the device by heat sealing. An adhesive 10 is provided on the bottom of backing 8 so that the freeze indicator may be readily attached to packages which need such an indicator. A paper cover 11, which is peelable from the adhesive, is applied over the adhesive 10 to protect the adhesive prior to use.

As can be seen from FIGS. 1 and 2, the ampule 3, which in this embodiment is glass, includes constricted neck 12. This constricted neck is at liquid fill height of the ampule when the ampule is upright. Air space is therefore provided above the restricted neck in region 13. The ampule is sealed with either an epoxy or a glass melt seal as indicated at 14. The air space of 13 provides for volumetric expansion of the liquid due to heating, such expansion being smaller than the volumetric expansion due to freezing. In this embodiment, approximately two percent (2%) air space is provided. The fill level of the ampule is indicated by line 15 shown in FIG. 1. The air space which is provided in region 13 should be within the limits of one to six percent (17-67) of the total volume of the ampule.

Figure 3:
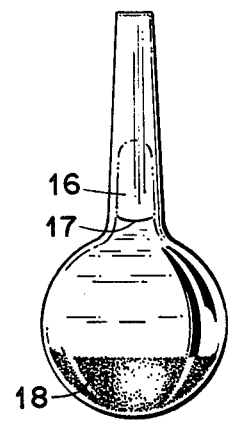
FIG. 3 is an alternative ampule which may be used in the indicator shown in FIG. 1.

Another embodiment of the ampule is shown in FIG. 3 in which a bulb-type container with capillary extension 16 is provided. The bulb is filled to a level 17 with the mixture of water, surfactant, and nucleating agent. A part of the nucleating agent, which in this embodiment may be cupric sulfide, is indicated as 18. The volume of the air space in the capillary portion of the ampule 16 is again within the range listed above. Thus the air space is small enough to permit breakage of the ampule due to the expansion of the freeing liquid, but large enough to allow thermal expansion of the liquid without breaking the ampule.

EXAMPLE I

A freeze indicator, as described above, has been made and tested wherein the following components were housed in the frangible container 3:
Water—$H_2O$—approximately ½ milliliter
Cupric Sulfide—CUS powder—12% weight
Surfactant—Atlas G-2127—0.25% weight Several hundred of these devices were exposed to an environment at −3° C. No devices were activated after one hour. However, ninety-eight percent (98%) of these devices provided an immediate indication, i.e. before thaw occurred, of a freeze by a color on Whatman paper 6 after exposure to −5° C. for one hour. Seventy-five percent (75%) of the devices froze between −3.5° C. and −4.5° C.

EXAMPLE II

Another thirty devices, as described above, were made and tested; however, a liquid comprising 0.5 milliliters 98% deuterium oxide ($D_2O$) and 2% $H_2O$ was added to the mixture in lieu of the water ($H_2O$). These devices were tested at 1° C. and none were activated after one hour. However, ninety-eight percent (98%) of the devices provided an immediate indication of freeze as described above, at −1° C. after one hour. Seventy-five percent (75%) of the devices froze between 0.5° C. and −0.5° C.

From the foregoing description of the illustrative embodiments of the invention, it will be apparent that many modifications may be made therein. It will be understood that these embodiments to the invention are intended as exemplification of the invention only in that this invention is not limited thereto. It is also to be understood, therfore, that it is intended for the appended claims to cover all modifications that fall within the true spirit and scope of the invention.

I claim:

1. A freeze indicator comprising:
   a frangible container, said container housing a liquid which expands upon freezing, thereby fracturing said container, said liquid having a nucleating agent disbursed therein, said nucleating agent being substantially insoluble in said liquid, liquid responsive indicator means, said nucleating agent and said liquid having substantially similar molecular space groupings whereby undercooling of said liquid is substantially prevented; said container further housing a surfacant which is mixed with said liquid and said nucleating agent before freezing of said liquid for providing increased contact between said nucleating agent and said liquid and further providing a decrease in surface tension between said container, when fractured, and said liquid whereby a substantial immediate indication of freezing is provided on said liquid responsive indicating means.

2. An indicator as set forth in claim 1 wherein said nucleating agent is taken from the group consisting of cupric sulfide, ferrous sulfide, zinc metal, molybdenum sulfide, tungsten sulfide, beryllium aluminum silicate, and silver iodide.

3. An indicator as set forth in claim 1 further including a protective package housing said frangible container, said protective package including a preformed, semi-rigid blister enclosing at least a portion of said frangible container.

4. An indicator as set forth in claim 1 wherein said frangible container is filled with said liquid to the extent that a void space is provided large enough to prevent breakage of heating but small to permit breakage upon freezing 5. An indicator as set forth in claim 4 wherein said frangible container includes a constricted neck 6. An indicator as set forth in claim 1 wherein said surfactant is polyoxyethylene 20 sorbitan monooleate.

7. An indicator as set forth in claim 1 wherein said liquid is taken from the group consisting essentially of water ($H_2O$) and deuterium oxide ($D_2O$).

8. An indicator as set forth in claim 1 wherein said liquid is a mixture of water ($H_2O$) and deuterium oxide ($D_2O$) for providing a predetermined freeze point indication.

9. An indicator as set forth in claim 8 wherein the amount of water is within the range of two to ninety-eight percent (2%-98%) of the total volume of the liquid and deuterium oxide is within the range of ninety-eight to two percent (98%-2%) of the total volume of the liquid.

10. A freeze indicator comprising:
a frangible container, said container housing a liquid which expands upon freezing, thereby fracturing said container; said liquid including a mixture of water ($H_2O$) and deuterium oxide ($D_2O$); said container further housing a nucleating agent and a surfactant, said surfactant being mixed with said liquid before freezing for providing increased contact between said nucleating agent and said liquid and further providing a decrease in surface tension between said container, when fractured, and said liquid, whereby a substantial immediate indication of freezing is provided; an indicator responsive to said liquid being in close association with said frangible container; said indicator providing an indication of freeze at a predetermined temperature as determined by the percent composition of the mixture of deuterium oxide and water.

11. An indicator as set forth in claim 10 further including a nucleating agent added to said liquid, said nucleating agent having a substantially similar molecular space grouping with said frozen liquid whereby undercooling of said liquid is substantially prevented.

12. A device as set forth in claim 11 wherein said nucleating agent is taken from the group consisting of cupric sulfide, ferrous sulfide, zinc metal, molybdenum sulfide, tungsten sulfide, beryllium aluminum silicate, and silver iodide.

13. An indicator as set forth in claim 10 wherein the percentage by weight of water is between two and ninety-eight percent (2%-98%) of said liquid and the percentage by weight of deuterium oxide is between ninety-eight percent and two percent (98%-2%) of said liquid.

* * * * *